May 17, 1966 D. D. NYE, JR 3,252,089
VOLTAGE COMPENSATION FOR NOISE IN A FREQUENCY METER
Filed May 22, 1961
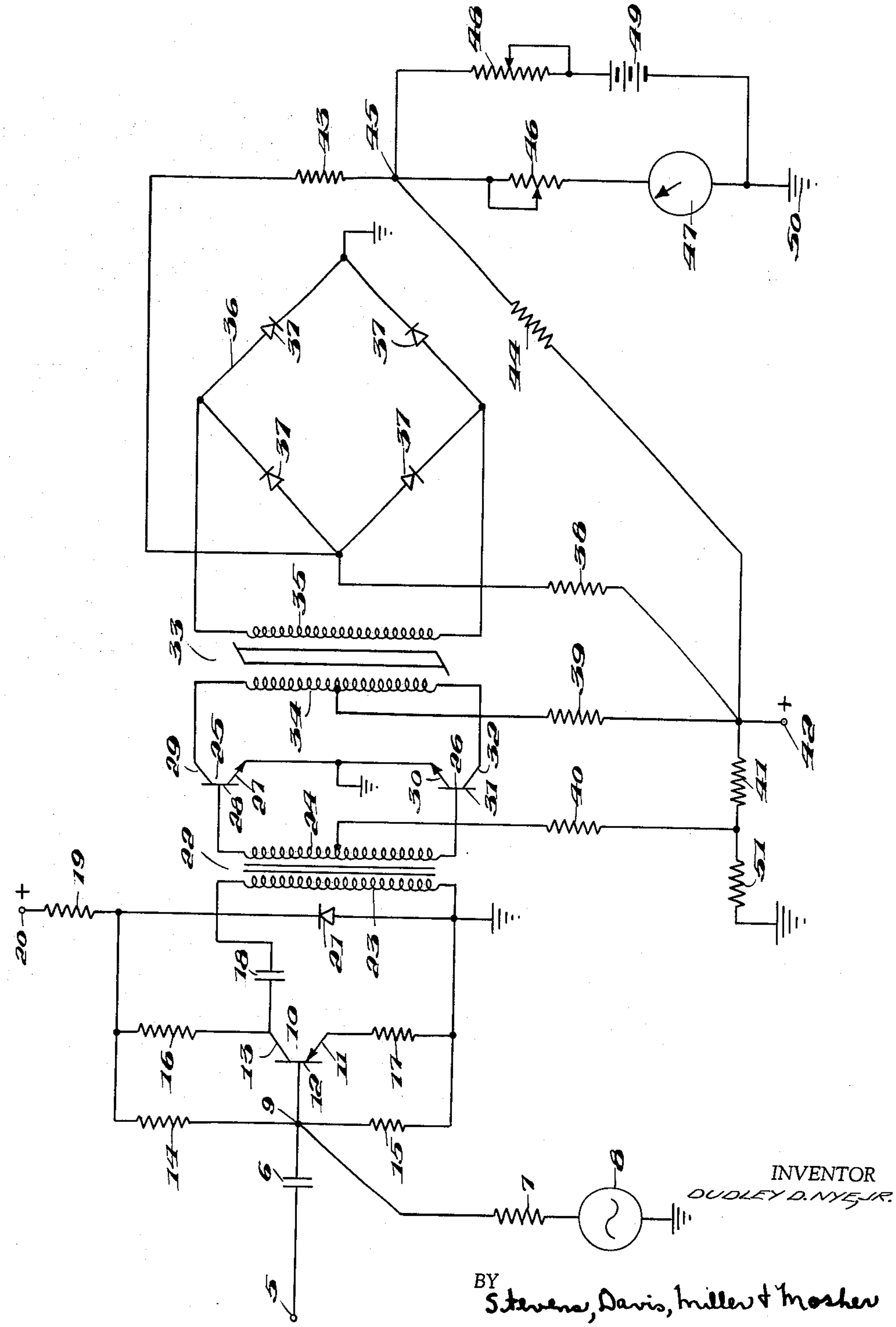
INVENTOR
DUDLEY D. NYE, JR.
BY
Stevens, Davis, Miller & Mosher
ATTORNEYS United States Patent Office 3,252,089

Patented May 17, 1966

3,252,089

VOLTAGE COMPENSATION FOR NOISE IN A FREQUENCY METER

Dudley D. Nye, Jr., Fort Lauderdale, Fla., assignor to Airpax Electronics Incorporated, Fort Lauderdale, Fla., a corporation of Maryland Filed May 22, 1961, Ser. No. 111,726
3 Claims. (Cl. 324—78)

This invention relates to voltage compensation for frequency detecting circuits, and more particularly to frequency detectors whose outputs are independent of low-amplitude extraneous input signals or noise signals.

One type of frequency detector, to which the principles of this invention apply, is known as a "Magmeter." Magmeter is a trade name used by Airpax Electronics Incorporated, Fort Lauderdale, Florida, to represent a frequency detecting circuit which delivers a D.C. output voltage proportional to the frequency of the input signal. The basic frequency detecting circuit is comprised of a saturating transformer and an output rectifying circuit. An amplifier can be used to amplify the input signal whenever the power from the input signal source is not sufficient to drive the frequency detecting circuit. Ideally, when the variable frequency input signal is of sufficient amplitude to cause core saturation, a further increase in amplitude will not change the D.C. output signal. Therefore, the characteristics of a true F.M. discriminator are attained.

This application is an improvement of the invention described in a prior and co-pending application which is now issued as Nye Patent 3,021,480, issued February 13, 1962.

In prior frequency detecting circuits or Magmeters, when void of primary input signals, low amplitude extraneous signals or noise signals are picked up at the input and reflected through the circuits to cause erroneous indications to appear at the outputs. Low signal to noise ratios may cause inaccurate readings to appear on the indicators at the outputs of the frequency detecting circuits. These inaccurate or erroneous indications at the outputs must be eliminated to provide improved frequency detecting circuits which will have a wider range of application. The prior art does not suggest a way to eliminate the present restriction or limitation of the frequency detecting circuits or Magmeters.

The difficulties or drawbacks of frequency detecting circuits have prompted a simple and inexpensive solution to these problems in the form of the present invention. This is accomplished by the present invention by connecting a low-frequency signal compensating source to the input terminals of the frequency detecting circuit. This source injects a signal having a frequency lower than the calibrated frequency range of the output indicator. When the main input signal is not connected across the input terminals, the low-frequency signal, which is larger in amplitude than the other extraneous or noise signals, is reflected through the circuit and causes an off-scale reading on the indicator. Thus injecting a low-frequency compensating signal into the input of the circuit prevents extraneous or noise signals from causing erroneous up-scale readings on the output indicator. The main input frequency signal must reach a preset magnitude, resulting in a relatively high signal-to-noise ratio, before an up-scale reading is obtained on the indicator. This prevents an inaccurate reading from being indicated when the signal-to-noise ratio is low. Accordingly, the present invention has the result of making the readings on the output indicator of a frequency detecting circuit independent of low-amplitude extraneous input signals or noise signals. Furthermore, this invention provides means for controlling and adjusting the signal level at which an up-scale reading is obtained on the output indicator of the frequency detecting circuit.

It is, therefore, the main object of this invention to provide a simple and inexpensive way of making the readings on the output indicator of a frequency detecting circuit independent of low-amplitude extraneous input signals or noise signals.

A further object of this invention is to provide a frequency detecting circuit which requires a high signal-to-noise ratio before an up-scale reading is obtained on the output indicator.

A still further object of this invention is to provide means for controlling and adjusting the signal level at which an up-scale reading is obtained on the output indicator of a frequency detecting circuit.

Other objects and advantages of the invention will become apparent from the following detailed description of a preferred embodiment of the invention when taken with the drawing which shows in the sole figure a schematic diagram of a preferred embodiment of the invention.

Referring now to the sole figure, there is shown a frequency detecting circuit, known as a Magmeter. It is appreciated that this invention can also be used with other suitable detecting circuits. The frequency detecting circuit delivers a D.C. output voltage proportional to the frequency of an input signal. It consists of a saturating transformer 33 having a primary winding 34 and a secondary winding 35 and a rectifying bridge 36. The core of the saturating transformer 33 has a square hysteresis loop. The rectifier bridge 36, consisting of four diodes 37, is connected across the secondary winding 35 of the saturating transformer 33. The output terminals 45 and 50 of the frequency detecting circuit are connected to the rectifying bridge 36 through resistor 43.

A push-pull transistor amplifier is used to supply the power required to drive the frequency detecting circuit. It is appreciated that the amplifier is not restricted to a transistor amplifier, but may also be a tube amplifier. The amplifier consists of two NPN transistors 25 and 26. Transistor 25 consists of an emitter 27, a base 28, and a collector 29, while transistor 26 consists of an emitter 30, a base 31, and a collector 32. The emitters 27 and 30 of transistors 25 and 26 are connected together. The collectors 29 and 32 of the transistors 25 and 26 are connected to the primary winding 34 of transformer 33. An input transformer 22 having primary winding 23 and secondary winding 24 is connected to the input of the push-pull transistor amplifier. The secondary winding 24 is connected to the bases 28 and 31 of transistors 25 and 26. A D.C. power supply is connected to terminal 42 in the ordinary manner. Terminal 42 of the positive side of the D.C. power supply is connected to the center tap of primary winding 34 of saturating transformer 33 through resistor 39. Terminal 42 is also connected to the center tap of secondary winding 24 of transformer 22 through resistor 40 and voltage divider 41 and 51. Resistors 38 and 44 connect the rectifying bridge 36 and the output terminal 45 to terminal 42 of positive side of the D.C. power supply. Resistor 44 provides a current path between the positive terminal 42 of the power supply and output terminal 45 to stabilize the output for D.C. power supply variations. Resistor 38 determines a bias current which sets diode 37 in an initial state of conduction. When diodes 37 are properly biased, the system output is not affected by second order signal amplitude changes on the primary 34 of transformer 33.

Input terminal 5 is connected to the primary winding 23 of input transformer 22 through an input transistor amplifier. It is appreciated that the transistor amplifier may also be a tube amplifier. The input amplifier is comprised of a PNP transistor 10 having an emitter 11, a base 12 and a collector 13. The collector 13 is connected to one side of primary winding 23 through capacitor 18. The input terminal 5 is connected to the base 12 through capacitor 6 and common junction 9. A second D.C. power supply is connected to terminal 20 in the ordinary manner. Terminal 20 or the positive supply is connected to the electrodes of the transistor 10 through resistor 19. The base 12 and collector 13 are connected together through resistors 14 and 16. The emitter 11 and base 12 are connected together through resistors 17 and 15. A Zener diode 21 is connected between resistor 19 and the other end of primary winding 23, which is connected to ground. Zener diode 21 minimizes the power supply ripple as well as regulating the voltage.

The input signal, which is first amplified by input amplifier 10, drives the transistor amplifier into saturation such that a square-wave output appears across the collectors 29 and 32 of transistors 25 and 26. The square-wave output, which consists of alternately positive and negative pulses, is applied to the primary winding 34 of the transformer 33. The saturating transformer 33 alters the input pulses so that the output across the secondary winding 35 consists of rectangular pulses having essentially constant volt-second areas. The bridge 36 rectifies the alternately positive and negative rectangular pulses appearing across the secondary winding 35 in a manner well known in the art. The resulting rectified output of the frequency detecting circuit is a series of constant area rectangular pulses. The average value of the output of the frequency detecting circuit is proportional to the frequency of the input signal, connected to terminal 5.

An indicating means, shown in the drawing as an ammeter 47, is connected across the output terminals 45 and 50 through calibrating rheostat 46. It is appreciated that the indicating means 47 is not restricted to an ammeter, but may also be a recorder or other suitable indicators. A reference voltage, shown in the drawing as a battery is connected across the output terminals 45 and 50 through calibrating rheostat 48. The ammeter 47 can be calibrated to measure a given range of frequencies of the input signal by adjusting rheostats 46 and 48 to give full-scale and zero readings on the ammeter at maximum and minimum input signal frequencies. By this method, it is possible to expand the scale of the ammeter so that accuracy and readibility of frequency indication over a specific region can be improved.

In order to make the output of the frequency detecting circuit independent of low-amplitude extraneous noise signals picked up at the input 5, when the main input signal is missing or excessively low in amplitude, a low-frequency source 8 is connected to the input of the frequency detecting circuit to comprise a suppressed zero type of circuit. The low-frequency compensating source 8 is connected to common junction 9 through resistor 7. The common junction 9 interconnects input terminal 5 and base 12 of transistor 10. By way of example, the source 8 has a frequency of 400 cycles per second and an amplitude of 90 volts. It is not my intention to limit the frequency of the source 8 to 400 cycles per second, but it may be a different frequency depending on the frequency range of the indicator 47. Furthermore, the amplitude of the source 8 may have a different value. The source 8 injects a signal of 400 cycles per second, which is lower than the calibrated frequency range of the output indicator or ammeter 47. Assuming the main input signal is not connected to input terminal 5, the low-frequency compensating signal, which has an amplitude larger than the extraneous or noise signals, is reflected through the circuit and causes an off-scale reading on ammeter 47, indicating that the input frequency is below the calibrated range. Thus, the low-frequency signal prevents extraneous or noise signals from causing erroneous up-scale reading on the ammeter 47 until a particular value of signal is attained. With the low-frequency signal causing an off-scale reading on the ammeter 47, the main input frequency signal must reach a preset magnitude, resulting in a relatively high signal-to-noise ratio, before an up-scale reading is obtained on the ammeter 47. This prevents an inaccurate or erroneous reading from being indicated on the ammeter 47 when the signal-to-noise ratio is low. The magnetic circuit accurately indicates the predominate frequency present at the input and ignores a lower amplitude signal since it inherently measures the number of zero cross-overs per unit time. The low-frequency source 8 provides means to control and adjust the signal level at which an up-scale reading is obtained on the ammeter 47. By making the readings on the output indicator or ammeter 47 independent of low-amplitude extraneous input signals or noise signals, the improved frequency detecting circuit can be utilized in more applications than prior frequency detecting circuits.

Although the present invention has been shown and described in terms of a specific preferred embodiment, changes and modifications which do not depart from the inventive concepts taught herein will suggest themselves to those skilled in the art. Such changes and modifications are deemed to fall within the scope and contemplations of the invention as set forth in the appended claims.

What is claimed is:

1. A stabilized frequency detecting circuit comprising means for generating noise signals connected at the input of said frequency detecting circuit, frequency detecting elements, an indicator connected to the output of said detecting elements, amplifying means connected by a transformer to the input of said detecting elements, said amplifying means including an input transistor having its base connected to an A.C. input terminal, its collector connected to the primary winding of said transformer, and its emitter connected to the other end of said primary winding, means applying a D.C. source to said collector to provide activation potential to the transistor, a Zener diode connected between the D.C. source and said other end of the primary winding to minimize the power supply ripple and regulate the voltage applied to the transistor, said generating means eliminating erroneous up-scale readings on said output indicator.

2. The invention of claim 1 wherein said generating means is a low frequency source coupled between the base of the transistor and said other end of the primary.

3. A stabilized frequency detecting circuit comprising frequency detecting elements, an indicator having a calibrated frequency range connected to the output of said detecting elements, said frequency detecting elements including an amplifying means transformer-coupled to a frequency detecting means, said amplifying means including an input transistor having its base connected to an A.C. input terminal, its collector connected to the primary of said transformer, and its emitter connected to the other end of the primary, means applying a D.C. source to said collector to provide activation potential to the transistor, a Zener diode connected between the D.C. source and said other end of the primary to minimize the power supply ripple and regulate the voltage applied to the transistor, and a low-frequency source connected to the input of said detecting elements to inject into the circuit a compensating signal having a frequency lower than the calibrated frequency range of said output indicator to cause off-scale readings on said indicator, said frequency detecting circuit thus being electrically independent of noise signals when the main input frequency signal is missing or below a pre-set minimum amplitude.

References Cited by the Examiner

UNITED STATES PATENTS

| | | | |
|---|---|---|---|
| 1,864,543 | 6/1932 | Horton | 324—79 |
| 2,908,864 | 10/1959 | Shepard | 324—78 X |
| 2,915,648 | 12/1959 | Chudleigh et al. | |
| 2,947,863 | 8/1960 | Buie | 324—78 X |
| 2,958,038 | 10/1960 | Kwast | 324—78 X |
| 3,004,220 | 10/1961 | Williamson | 324—78 |
| 3,021,480 | 2/1962 | Nye | 324—78 |

WALTER L. CARLSON, *Primary Examiner.*

SAMUEL BERNSTEIN, *Examiner.*